United States Patent
Puri et al.

(10) Patent No.: US 6,820,464 B2
(45) Date of Patent: Nov. 23, 2004

(54) ODORIZED SEALS FOR THE DETECTION OF GAS LEAK

(75) Inventors: Pushpinder Singh Puri, Emmaus, PA (US); James Gordon Hansel, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/321,076

(22) Filed: Dec. 16, 2002

(65) Prior Publication Data

US 2004/0112118 A1 Jun. 17, 2004

(51) Int. Cl.[7] .............................. G01M 3/04; G01M 3/22
(52) U.S. Cl. .................... 73/40; 73/40.7; 436/3; 116/214
(58) Field of Search ................ 73/40, 40.7; 436/3; 116/214; 48/195

(56) References Cited

U.S. PATENT DOCUMENTS 3,003,349 A * 10/1961 Sullivan et al. ............... 73/40.7
3,854,894 A * 12/1974 Klass et al. ..................... 48/195
6,063,632 A    5/2000 Perkins ............................ 436/3

FOREIGN PATENT DOCUMENTS

JP     2000-220935     *  8/2000 ............... 73/40
WO        0011120         3/2000

OTHER PUBLICATIONS

Proc. U.S. DOE Hydrogen Program Rev. (1996), vol. 2, pp. 569–604.
M. J. Usher (Proc. Int. Scho. Hydrocarbon Meas. 73rd, pp. 743–748 (1998).
I. Katuran (Proc. Int. Sch. Hydrocarbon Meas., 64th, pp. 325–330 (1989).

* cited by examiner

Primary Examiner—Daniel S. Larkin
(74) Attorney, Agent, or Firm—Keith D. Gourley

(57) ABSTRACT

An apparatus for detecting a leak of a fluid from a system for storing and/or transporting a volume of the fluid includes an odorant material. The system includes at least one vessel and at least one sealant having an outer surface. The odorant material is encapsulated or sorbed on the sealant, at least a portion of the odorant material having at least one detectable odor.

4 Claims, 2 Drawing Sheets

ODORIZED SEALS FOR THE DETECTION OF GAS LEAK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to fluid leak detection, and in particular to the leak detection of gases by odor generated by adding odiferous materials to the gases.

With the advent of the fuel cell technology and a drive for clean fuel, hydrogen gas is emerging as a leading candidate for the fuel of choice. In addition to the benefit of being oxidizable in an emission free manner, hydrogen may be obtained from an abundant, renewable, resource, water.

For hydrogen to become a consumer fuel for automobile and domestic power generation, safety is paramount. Although safe handling and use of hydrogen is well understood, warnings are needed to alert against any leaks. Hydrogen sensors are commercially available, but are not considered to be an absolute safeguard against leaks due to their potential for malfunctioning, changing air currents, etc. Human senses, in particular, the sense of smell, are considered to be the ultimate safeguard against leaks. Since hydrogen is an odorless gas, odorants are preferably incorporated in hydrogen for easy leak detection. A review of the codes, standards, regulations, recommendations, and certifications on the safety of gaseous fuels is addressed in a report, Proc. U.S. DOE Hydrogen Program Rev. (1996), Vol. 2, pages 569–604.

Odorization of gases for leak detection is well known in the natural gas and petroleum gas industries. For example, a paper by M. J. Usher (*Proc. Int. Scho. Hydrocarbon Meas.* $73^{rd}$, pages 743–48 (1998)) reviews the history, application, compounds, and safety practices in selecting and applying odorants in the natural gas industry. Mixing small quantities of odorants with gases is a substantially universal practice in natural and petroleum gases. For example, a paper by I. Katuran (*Proc. Int. Sch. Hydrocarbon Meas.*, $64^{th}$, pages 325–30 (1989)) reports on natural gas odorants, their safety and handling precautions, handling techniques, and methods of adding odorants to gases.

Nearly all of the methods for odorization of natural and petroleum gases consist of metering a certain amount of the odorant into a gas stream to a level where detection can be made by the human sense of smell. Natural gas for public gas supplies typically contains 5–10 mg of sulfur per cubic meter of gas. However, odorants for hydrogen used as an energy source for fuel cells have unique requirements which must be met. This is because most of the commercial odorants used in gas leak detection act as poisons for the catalysts used in hydrogen based fuel cells, most specifically for the PEM (polymer electrolyte membrane or proton exchange membrane) fuel cells. Chemical compounds based on mixtures of acrylic acid and nitrogen compounds have been adopted to achieve a sulfur-free odorization of a gas. See, for example, WO 00/11120 (PCT/EP99/05639) by Haarmann & Reimer GmbH. However, these formulations are either ineffective or do not have general acceptance by users. Also, in the use of natural gas and other petroleum gases for hydrogen generation for fuel cell applications, sulfur free natural or petroleum gases are needed, or else a desulfurization step must be incorporated in the reforming process, which adds further cost to hydrogen generation.

The PEM fuel cells are sulfur intolerant because sulfur compounds poison the noble metal catalysts used in these fuel cells. If sulfur-containing odorants are used, it would be necessary to remove sulfur containing materials, like mercaptan odorants, from the feed gas using materials like zinc oxide. The sulfur containing materials, like thiophenes, cannot be removed by zinc oxide and may require a hydrodesulfurization process, using hydrogen gas, to remove sulfur. This all will add to the cost of the process.

A further complexity for hydrogen fuel comes from the nature of the hydrogen flame propagation. When gases burn in air, their flames propagate upwards with greater ease than they propagate downwards. This is primarily due to the natural convection of hot burnt gases in an upward direction. For petroleum gases, propane and methane, the upward and downward propagating lean limits of combustion are approximately the same. However, for hydrogen, since they differ by a factor of 2.5, the amount of odorant needed for leak detection in hydrogen could be >2.5 times that needed for methane or propane. The higher quantity of the odorant needed for hydrogen odor detection further complicates the sulfur poisoning problems for hydrogen gas used in the PEM fuel cells.

In several other gas applications, particularly when gases are odorless, toxic, or are otherwise harmful, methods of leak detection using odiferous materials are also desirable. The gases included in this category are, for example, nitrogen, carbon monoxide, nitrogen trifluoride, ethylene oxide, carbon tetrafluoride, and other perfluoro gases.

Several other issues also have been encountered in the odorization of the natural and petroleum gases. The key ones are (1) hydrocarbon masking the odor of the odiferous materials, (2) adsorption of the odorant on the storage vessel and pipe walls, (3) reaction of the odorants with low molecular weight mercaptans (naturally occurring in the gas), (4) condensation of the odorants in the gas storage vessel and pipes, and (5) physical scrubbing of the mercaptans from the gas with liquids (associated with the natural gas).

Today, approximately twenty-five different blends are used as natural gas odorants. Of these twenty-five blends, seven blends are more prevalent. Almost all of the odorant agents are sulfur compounds, e.g., mercaptans (tetrabutyl mercaptan, isopropyl mercaptan, normal propyl mercaptan, secondary butyl mercaptans, ethyl mercaptans, normal butyl mercaptan, etc.), thiophenes (tetrahydrothiophene), sulfides (dimethyl sulfide, methyl ethyl sulfide), etc.

In addition to the pungent odors of these chemicals, the chemicals used are also expected to have certain other attributes, such as low vapor pressure (high boiling point), low freezing point, low specific gravity so that they are fully dispersed in the gas, and appropriate thermal properties (e.g., they will not freeze at appropriate temperatures and will not cause over odorization in the hot weather). The general quality requirements, as specified for sulfur containing odorants in ISO/DIS 13734, are: (1) a cloud point of less than −30 degrees Celsius, (2) a boiling point of less than 130 degrees Celsius, and (3) evaporation residue of less than 0.2%.

Requirements for odorants further will likely include an odorant concentration high enough to allow detection with a fuel gas concentration of ⅕ the lean limit of combustion. These requirements exist for natural gas (SAE J 1616, NFPA 52-1992) and petroleum gas (NFPA 58-1989).

It is, therefore, desired to have a method and system for the use of odorants in gas storage and delivery systems in which the odorants are not dispersed in the bulk gas but are accessible only to the leaking gas streams, thus alleviating the above said concerns and making leak detection by smell viable without adding odorants in the entire gas stream.

It is further desired to have a system and method for the use of odorants in gas storage and delivery systems which can be used for gas leak detection with the use of an odorant(s), where the odorant(s) do not contaminate the bulk gas stream.

It is also desired to have such a system and method which overcomes the difficulties and disadvantages of the prior art to provide better and more advantageous results.

BRIEF SUMMARY OF THE INVENTION

The present invention is an apparatus and method for detecting a leak of fluid from a system for storing and/or transporting a volume of the fluid. There are several embodiments of the apparatus and the method, as discussed below. In a number of the embodiments, the fluid is a pressurized gas.

With regard to the apparatus of the invention, a first embodiment is an apparatus for detecting a leak of a fluid from a system for storing and/or transporting a volume of a fluid, the system comprising at least one vessel and at least one sealant having an outer surface. The apparatus includes an odorant material encapsulated or sorbed on the sealant, at least a portion of the odorant material having at least one detectable odor.

There are several variations of this first embodiment of the apparatus. In one variation, the detectable odor is detectable by a sense of smell of a living being. In another variation, the fluid is hydrogen. In yet another variation, the fluid is a gas. In a variant of that variation, at least a portion of the gas is at or above an ambient pressure.

In another variation of the first embodiment of the apparatus, a flow of the fluid flows from the vessel through the sealant, whereby the flow of the fluid picks up and transmits a portion of the odorant material into an atmosphere surrounding the outer surface of the sealant.

In another variation of the first embodiment, at least a portion of the odorant material is selected from a group consisting of mercaptans (tetrabutyl mercaptan, isopropyl mercaptan, normal propyl mercaptan, secondary butyl mercaptans, ethyl mercaptans, normal butyl mercaptan), thiophenes (tetrahydrothiophene), sulfides (dimethyl sulfide, methyl ethyl sulfide), and combinations thereof, and odorants selected from a group consisting of derivatives of acrylic acid, alkyl ethers of $C_4$–$C_7$, carboxylic acids, and combinations thereof.

In yet another variation, at least a portion of the odorant material is encapsulated on the sealant with a polymer selected from a group consisting of a rubbery polymer, a glassy polymer, and combinations thereof, the rubbery polymer being selected from a group consisting of polydimethyl siloxanes, poly phosphazenes, and combinations thereof, and the glassy polymer being selected from a group consisting of polyimides, polysulfones, polyamides, polyarylates, polyolefins, polyetherketones, polycarbonates, polydienes, polytetrafluroethane, polyvinyalidinefluoride, polyetherimides, and combinations thereof.

Another embodiment of the apparatus of the present invention is an apparatus for detecting a leak of a pressurized gas from a system for storing and/or transporting a volume of the pressurized gas, the system comprising at least one vessel and at least one sealant having an outer surface. The apparatus includes an odorant material encapsulated or sorbed on the sealant, at least a portion of the odorant material having at least one detectable odor, detectable by a sense of smell of a living being. A flow of the pressurized gas flows from the vessel through the sealant, wherein the flow of the pressurized gas picks up and transmits a portion of the odorant material into an atmosphere surrounding the surface of the sealant.

With regard to the method of the present invention, there also are several embodiments. The first embodiment is a method for detecting a leak of a fluid from a system for storing and/or transporting a volume of the fluid, the system comprising at least one vessel and at least one sealant having an outer surface. The method includes multiple steps. The first step is to encapsulate or sorb an odorant material on the sealant, at least a portion of the odorant material having at least one detectable odor. The second step is to transmit a flow of the fluid from the vessel through the sealant, whereby the flow of the fluid picks up and transmits a portion of the odorant material into an atmosphere surrounding the outer surface of the sealant. The third step is to detect the detectable odor in the surrounding atmosphere.

There are several variations of the first embodiment of the method. In one variation, the detectable odor is detectable by a sense of smell of a living being. In another variation, the fluid is hydrogen. In yet another variation, the fluid is a gas. In a variant of that variation, at least a portion of the gas is at or above an ambient pressure.

In another variation of the first embodiment of the method, at least a portion of the odorant material is selected from a group consisting of mercaptans (tetrabutyl mercaptan, isopropyl mercaptan, normal propyl mercaptan, secondary butyl mercaptans, ethyl mercaptans, normal butyl mercaptan), thiophenes (tetrahydrothiophene), sulfides (dimethyl sulfide, methyl ethyl sulfide), and combinations thereof, and odorants selected from a group consisting of derivatives of acrylic acid, alkyl ethers of C4–C7, carboxylic acids, and combinations thereof.

In yet another variation of the method, at least a portion of the odorant material is encapsulated on the sealant with a polymer selected from a group consisting of a rubbery polymer, a glassy polymer, and combinations thereof, the rubbery polymer being selected from a group consisting of polydimethyl siloxanes, poly phasphazenes, and combinations thereof, and the glassy polymer being selected from a group consisting of polyimides, polysulfones, polyamides, polyarylates, polyolefins, polyetherketones, polycarbonates, polydienes, polytetrafluroethane, polyvinyalidinefluoride, polyetherimides, and combinations thereof.

Another embodiment is a method for detecting a leak of a pressurized gas from a system for storing and/or transporting a volume of the pressurized gas, the system comprising at least one vessel and at least one sealant having an outer surface. The method includes multiple steps. The first step is to encapsulate or sorb an odorant material on the sealant, at least a portion of the odorant material having at least one detectable odor. The second step is to transmit the flow of the pressurized gas from the vessel through the sealant, whereby the flow of the pressurized gas picks up and transmits a portion of the odorant material into an atmosphere surrounding the outer surface of the sealant. The third step is to detect the detectable odor in the surrounding atmosphere.

DETAILED DESCRIPTION OF THE INVENTION

The present invention is directed to a system and method which can be used for gas leak detection with the use of odorants, where the odorant is not mixed with the bulk gas stream.

Specifically, a system and method of leak detection for non-odorous, flammable, and toxic gases is provided in which odorants are not mixed in the bulk gas, but are placed in the path of the gas leak. In the present invention, odorants are encapsulated between an appropriate semi-permeable material layer and walls of the gas storage vessels. For purposes of the present invention, the term "vessel" is intended to include any vessel or other piping or piping system capable of containing a pressurized gas, including all appurtenances. The term "appurtenances" is intended to include fittings, valves, meters, regulators, and any other devices or objects attached to the vessel and piping which include part of the total gas storage space.

The properties of the semi-permeable material layer are such that the material permits the transport of the stored gases into the encapsulated space where the odorants are placed, but does not permit the transport of the odoriferous substances into the bulk gas or the surrounding atmosphere. The odorants are encapsulated or sorbed on the stuffing, packing, sealants, and the like used in the fittings, joints, and valves or other potential leak sites on the vessel. Odorants also may be encapsulated in between two layers of the semi-permeable materials of similar or different gas transport properties.

In the event of a gas leak from the gas vessel or piping, gas will travel from the bulk storage area within the vessel to the gas leak spot due to the gas pressure gradient. For the leaking gas to travel from the bulk to the leak spot, it must pass through the odorant laced material layer and pick up the odorants. As the gas passes through the odorants, the gas carries with it the odorant materials and releases a mixture of the gas and odorant materials from the leak spot. The gas leak, therefore, may be detected by the smell of the odorant. Thus, a gas leak may be detected without contaminating the bulk gas supply. The odorant material volatility is such that it has a certain vapor pressure at the storage temperature and it diffuses into the leaking gas to impart to it a detectable amount of the odorant. Alternatively, the odorants can be physically carried (entrained) by the high pressure leaking gas to impart in the gas a detectable amount of odorant. Both of these mechanisms may prevail at any given time during the leak of the gas from the vessel.

Figure 1:
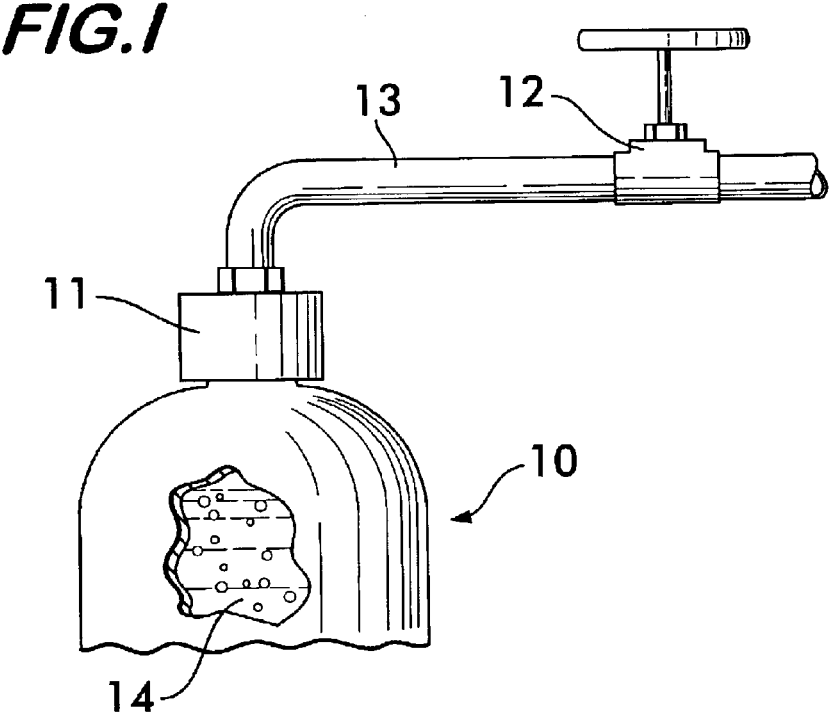
FIG. 1 is a simplified, partial, cross-sectional view of a gas storage vessel and it's appurtenance in accordance with one embodiment of the present invention.

Referring now to the drawings, FIG. 1 shows a simplified portion of a cross section of a vessel 10 (or piping) in accordance with one embodiment of the present invention. The vessel 10 has a vessel connection 11 to deliver gas 14. An odorant is sorbed in the stuffing used in the connection 11. A flow regulation valve 12 is connected to the connecting line 13 connecting the vessel and the valve. The gasket used in the valve 12 also has odorant encapsulated in it.

Figure 2:
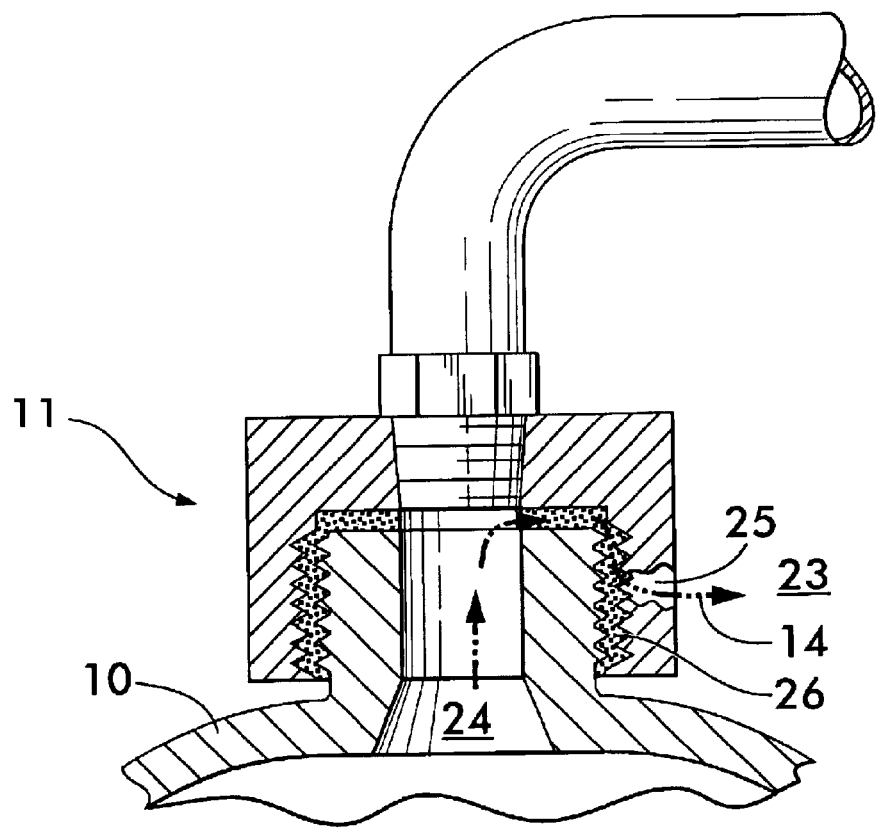
FIG. 2 is a simplified, partial, enlarged, cross-sectional view of the stuffed fitting used in the vessel of FIG. 1 showing a leak point of gas through the vessel wall.

As shown in FIG. 2, when a leak develops in the storage vessel 10 at the connection 11, stored gas 14 rushes through the leak site orifice 25 from connection 11, i.e., the high-pressure side 24 of the vessel wall to the low-pressure side 23. Since the leaking gas has to permeate through the odorant layer 26, the leaking gas carries with it an appropriate amount of the odorant, thus imparting an odor in the leaking gas.

Figure 3:
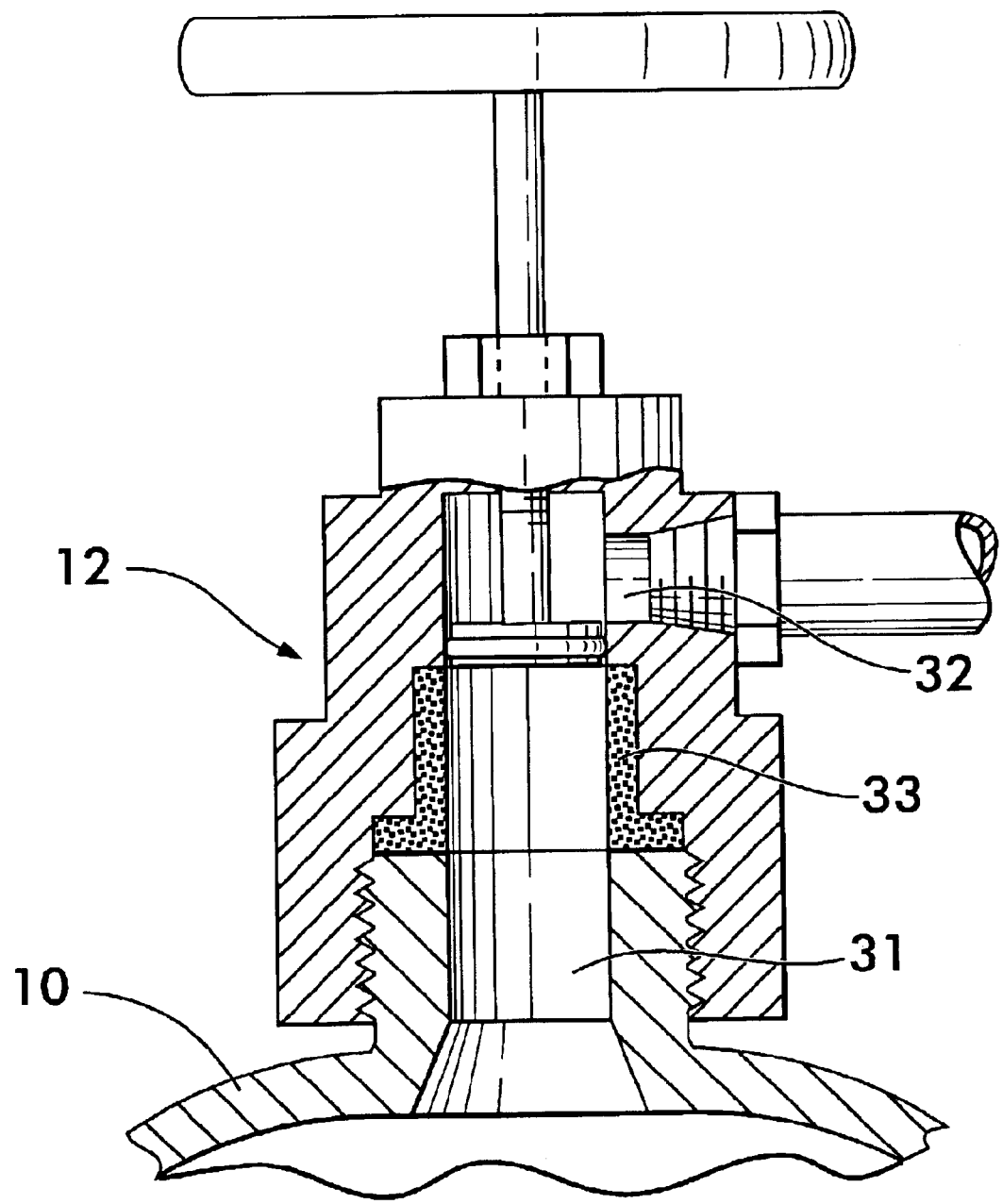
FIG. 3 is a simplified, partial, cross-sectional view of a valve used in the vessel of FIG. 1 showing a leak point of the valve.

FIG. 3 illustrates a simplified portion of a cross section of a flow regulation valve 12 in accordance with another embodiment of the present invention. The valve 12 has a high-pressure side 31 and a low-pressure side 32. However, here, the odorant layer 33 is located on the inner side of the valve 12 such that any gas leak from the valve will have to pass through an odor containing packing or gasket in the valve 12. Again, since the leaking gas from valve 12 has to permeate through the odorant layer 33 before it reaches the low-pressure side 32, the leaking gas carries with it an appropriate amount of the odorant, thus imparting an odor in the leaking gas.

The invention will be illustrated in more detail with reference to the following Examples, but it should be understood that the present invention is not limited thereto.

EXAMPLES

Example 1

A solution of the odoriferous materials such as: mercaptans (tetrabutyl mercaptan, isopropyl mercaptan, normal propyl mercaptan, secondary butyl mercaptans, ethyl mercaptans, normal butyl mercaptan, etc.), thiophenes (tetrahydrothiophene), sulfides (dimethyl sulfide, methyl ethyl sulfide), and the like, and their combinations, is made and applied to the stuffings, packing, gaskets, sealants, and the like. Other suitable odorants consist of derivatives of acrylic acid, alkyl ethers of $C_4$–$C_7$, carboxylic acids, and combinations thereof. The odoriferous material solution is made at a concentration of 0.01% w/w to 100% w/w, either in aqueous or non aqueous solvent/solvent mixtures of relatively high volatility solvents in which the odoriferous materials are soluble. These solvents can be both polar and nonpolar solvents such that the odoriferous material solution is capable of wetting the gaskets, stuffings, packing, etc. used in the joints, valves, and the other accessories used in the gas storage and delivery vessel. The odorant is soaked, sorbed, or encapsulated in the sealants, gaskets, etc. used in the fittings and the valves. The thin encapsulating layer is formed on the odorant film, for example, using a rubbery polymer, such as polydimethyl siloxane amongst other rubbery materials, and glassy polymers, such as polyimides, polysulfones, polyamides, polyarylates, polyolefins, polycarbonates, polyetherimides, polyetherketones, polydienes, polytetrafluroethane, polyvinyalidine-fluoride, and the like. In some cases, to block the defects in the original encapsulation, an over coating is then made by dissolving a rubbery or glassy film forming polymer in an appropriate volatile solvent at a concentration ranging from 0.1% to 10% solution depending on the thickness of the coating needed.

Example 2

The odoriferous material in Example 1 is mixed with an appropriate polymer to make a coating solution capable of forming a film on the surface of the various sealants used in the vessel and its appurtenances. The odorant/polymer coating is then encapsulated by making an additional layer of rubbery or glassy polymers.

Example 3

The coating described in Example 2 is cross linked either by use of cross linking agents in the coating solution and/or using external means, e.g., heat, irradiation, and the like, to cross link the coating. A cross linked coating may be structurally stronger and less prone to the attack of the solvents than to a non-cross linked coating. The art of making coatings of the rubbery materials and their cross-linking is taught by J. H. Henis and M. K. Tripodi in U.S. Pat. No. 4,230,463 and described in a paper published in the *Journal of Membrane Science,* 8, 233 (1981).

While various embodiments of the invention have been described in detail with reference to the drawings and the specific examples above, it will be apparent to one skilled in the art that various changes and modifications can be made to those embodiments, drawings, and examples without departing from the spirit and scope of the invention as defined in the claims which follow.

What is claimed is:

1. An apparatus for detecting a leak of pressurized hydrogen from a system for storing and/or transporting a volume of the pressurized hydrogen, the system comprising at least one vessel and at least one semi-permeable sealant having an outer surface wherein the semi-permeable sealant permits transport of hydrogen, but does not permit transport of the odorant into the hydrogen or an atmosphere surrounding the outer surface of the sealant, comprising:

an odorant material encapsulated on the sealant, at least a portion of the odorant material having at least one detectable odor, detectable by a sense of smell of a living being, wherein a flow of the pressurized gas flows from the vessel through the sealant, whereby the flow of the pressurized gas picks up and transmits a portion of the odorant material into the atmosphere surrounding the outer surface of the sealant wherein at least a portion of the odorant material is encapsulated on the sealant with a polymer selected from a group consisting of a rubbery polymer, a glassy polymer, and combinations thereof, the rubbery polymer being selected from a group consisting of a polydimethyl siloxanes, poly phasphazenes, and combinations thereof, and the glassy polymer being selected from a group consisting of polyimides, polysulfones, polyamides, polyarylates, polyolefins, polyetherketones, polycarbonates, polydienes, polytetrafluroethane, polyvinyalidine-fluoride, polyetherimides, and combinations thereof.

2. The apparatus as in claim 1, wherein at least a portion of the odorant material is selected from a group consisting of mercaptans (tetrabutyl mercaptan, isopropyl mercaptan, normal propyl mercaptan, secondary butyl mercaptan, ethyl mercaptans, normal butyl mercaptan), thiophenes (tetrahydrothiophene), sulfides (dimethyl sulfide, methyl ethyl sulfide), and combinations thereof, and odorants selected from a group of derivatives of acrylic acid, alkyl ethers of $C_4$–$C_7$, carboxylic acids, and combinations thereof.

3. A method for detecting a leak of pressurized hydrogen from a system for storing and/or transporting a volume of the pressurized hydrogen, the system comprising at least one vessel and at least one semi-permeable sealant having an outer surface wherein the semi-permeable sealant permits transport of hydrogen, but does not permit transport of the odorant into the hydrogen or an atmosphere surrounding the outer surface of the sealant, comprising the steps of:

encapsulating an odorant material on the sealant, at least a portion of the odorant material having at least one detectable odor;

transmitting a flow of the pressurized hydrogen from the vessel through the sealant, whereby the flow of the pressurized hydrogen picks up and transmits a portion of the odorant material into the atmosphere surrounding the outer surface of the sealant; and detecting the detectable odor in the surrounding atmosphere wherein at least a portion of the odorant material is encapsulated on the sealant with a polymer selected from a group consisting of a rubbery polymer, a glassy polymer, and combinations thereof, the rubbery polymer being selected from a group consisting of polydimethyl siloxanes, poly phasphazenes, and combinations thereof, and the glassy polymer being selected from a group consisting of polyimides, polysulfones, polyamides, polyarylates, polyolefins, polyetherketones, polycarbonates, polydienes, polytetrafluroethane, polyvinyalidine-fluoride, polyetherimides, and combinations thereof.

4. The method as in claim 3, wherein at least a portion of the odorant material is selected from a group consisting of mercaptans (tetrabutyl mercaptan, isopropyl mercaptan, normal propyl mercaptan, secondary butyl mercaptan, ethyl mercaptans, normal butyl mercaptan), thiophenes (tetrahydrothiophene), sulfides (dimethyl sulfide, methyl ethyl sulfide), and combinations thereof, and odorants selected from a group of derivatives of acrylic acid, alkyl ethers of $C_4$–$C_7$, carboxylic acids, and combinations thereof.

* * * * *